United States Patent
Kaneko et al.

(10) Patent No.: US 12,252,006 B2
(45) Date of Patent: Mar. 18, 2025

(54) DRIVING DEVICE FOR ENERGY REPLENISHMENT PORT VISOR MEMBER

(71) Applicants: TOYODA GOSEI CO., LTD., Kiyosu (JP); TOYOTA JIDOSHA KABUSHIKI KAISHA, Toyota (JP)

(72) Inventors: Kenichiro Kaneko, Kiyosu (JP); Kazuki Fujisawa, Nagoya (JP); Susumu Otsuka, Handa (JP)

(73) Assignees: TOYODA GOSEI CO., LTD., Aichi-pref. (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 442 days.

(21) Appl. No.: 17/947,296

(22) Filed: Sep. 19, 2022

(65) Prior Publication Data

US 2023/0087162 A1    Mar. 23, 2023

(30) Foreign Application Priority Data

Sep. 21, 2021   (JP) ................................. 2021-153685

(51) Int. Cl.
  *B60K 15/04*   (2006.01)
  *B60K 15/05*   (2006.01)
  *B60L 53/16*   (2019.01)
(52) U.S. Cl.
  CPC .......... *B60K 15/0406* (2013.01); *B60K 15/05* (2013.01); *B60L 53/16* (2019.02);
  (Continued)
(58) Field of Classification Search
  None
  See application file for complete search history.

(56) References Cited

U.S. PATENT DOCUMENTS

| 8,870,582 | B2 |  | 10/2014 | Yamamaru et al. |
| 11,993,167 | B2 | * | 5/2024 | Johansson ............... B60L 53/30 |

(Continued)

FOREIGN PATENT DOCUMENTS

| JP | 2012-77514 | A |  | 4/2012 |
| JP | 2016-88252 | A |  | 5/2016 |
| JP | 2020075562 | A | * | 5/2020 |

OTHER PUBLICATIONS

Office Action dated Jul. 25, 2023 issued in corresponding JP patent application No. 2021-153685 (and English translation).

*Primary Examiner* — Muhammad Adnan
(74) *Attorney, Agent, or Firm* — Posz Law Group, PLC (57) ABSTRACT

This driving device for energy replenishment port visor member includes: a visor member which advances/retracts between an advanced position for covering, from above, a replenishment port exposed at a vehicle-body-side opening and used for replenishing a vehicle with energy, and a retracted position where the visor member is retracted from above the replenishment port; a visor driving unit which advances/retracts the visor member between the advanced position and the retracted position; a gun connection detection unit which detects whether or not an energy replenishment gun is connected to the replenishment port; and a control unit which causes the visor driving unit to execute advancing-driving for advancing the visor member from the retracted position to the advanced position, when the gun connection detection unit has detected that the energy replenishment gun is connected to the replenishment port in a state in which the visor member is at the retracted position.

6 Claims, 7 Drawing Sheets

(52) U.S. Cl.
CPC ............... *B60K 2015/0416* (2013.01); *B60K 2015/0429* (2013.01); *B60K 2015/0435* (2013.01); *B60K 2015/049* (2013.01)

(56) References Cited

U.S. PATENT DOCUMENTS

| | | |
|---|---|---|
| 2013/0157485 A1 | 6/2013 | Yamamaru et al. |
| 2016/0273574 A1* | 9/2016 | Wicks ................... B60K 25/06 |
| 2018/0142512 A1 | 5/2018 | Dillinger et al. |
| 2021/0101493 A1* | 4/2021 | Ewald ................ H01R 13/5202 |
| 2023/0191926 A1* | 6/2023 | Cretin ................ H01R 13/5213 |
| | | 439/589 |

* cited by examiner

DRIVING DEVICE FOR ENERGY REPLENISHMENT PORT VISOR MEMBER

TECHNICAL FIELD

The present invention relates to a driving device for energy replenishment port visor member.

BACKGROUND ART

Conventionally, there has been known a device including a visor member for covering, from above, a replenishment port such as a fuel port or a charge port provided so as to be exposed at a vehicle-body-side opening of a vehicle (for example, Japanese Laid-Open Patent Publication No. 2016-88252). When an open/close lid is moved from a closed position where the vehicle-body-side opening is closed to an opened position where the vehicle-body-side opening is opened, the replenishment port is exposed and thus becomes connectable to an energy replenishment gun such as a refueling gun or a charging gun for replenishing the vehicle with energy. In addition, the visor member covers, from above, the replenishment port exposed at the vehicle-body-side opening. Since the visor member covers the replenishment port from above even when the open/close lid is at the opened position, the visor member prevents entry of rain/snow into the replenishment port.

SUMMARY OF INVENTION

Technical Problem

In the device described in Japanese Laid-Open Patent Publication No. 2016-88252, at the same time as the open/close lid moves from the closed position to the opened position, the visor member opens in a sector shape to cover the replenishment port from above. Therefore, when an operator such as a vehicle user is about to connect the energy replenishment gun to the replenishment port exposed at the vehicle-body-side opening in a state in which the open/close lid is opened, the replenishment port has already been covered by the visor member from above, and connection operation for the energy replenishment gun to the replenishment port is likely to be difficult by being obstructed by the visor member.

The present invention has been made in view of the above circumstances, and an object of the present invention is to provide a driving device for energy replenishment port visor member that prevents entry of rain/snow into the replenishment port, using a visor member, without deteriorating connection operability for an energy replenishment gun to a replenishment port.

Solution to Problem

An aspect of the present invention is directed to a driving device for energy replenishment port visor member, including: a visor member to be advanced/retracted between an advanced position where the visor member covers, from above, a replenishment port exposed at a vehicle-body-side opening and used for replenishing a vehicle with energy, and a retracted position where the visor member is retracted from above the replenishment port; a visor driving unit configured to advance/retract the visor member between the advanced position and the retracted position; a gun connection detection unit configured to detect whether or not an energy replenishment gun is connected to the replenishment port; and a control unit configured to cause the visor driving unit to execute advancing-driving for advancing the visor member from the retracted position to the advanced position, when the gun connection detection unit has detected that the energy replenishment gun is connected to the replenishment port in a state in which the visor member is at the retracted position.

In this configuration, when the energy replenishment gun is connected to the replenishment port, the visor member advances from the retracted position to the advanced position so as to cover the replenishment port from above. Thus, entry of rain/snow into the replenishment port is prevented. In addition, unless the energy replenishment gun is connected to the replenishment port, the visor member does not advance from the retracted position to the advanced position. Thus, such a situation that connection operation for the gun to the replenishment port is obstructed by the visor member, is avoided. Therefore, entry of rain/snow into the replenishment port is prevented using the visor member, without deteriorating connection operability for the energy replenishment gun to the replenishment port.

DESCRIPTION OF EMBODIMENTS

Hereinafter, with reference to FIG. 1 to FIG. 10, a specific embodiment of a driving device for energy replenishment port visor member according to the present invention will be described.

Figure 1:
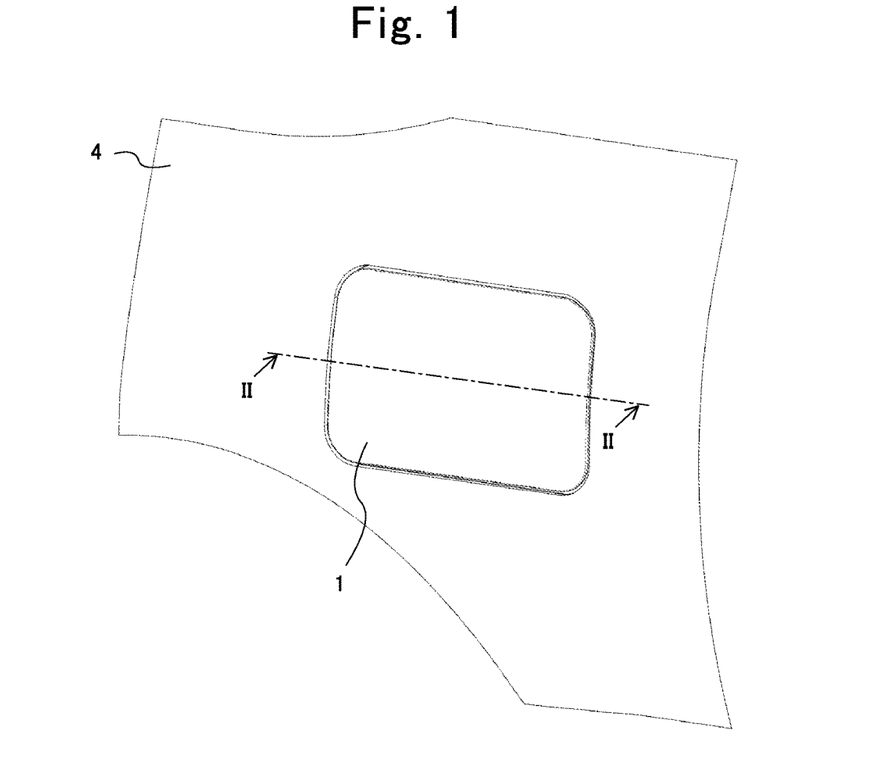
FIG. 1 shows a state in which a driving device for energy replenishment port visor member according to an embodiment of the present invention is attached to a vehicle body and is at a lid closed position, as seen from an obliquely upper side.
Figure 2:
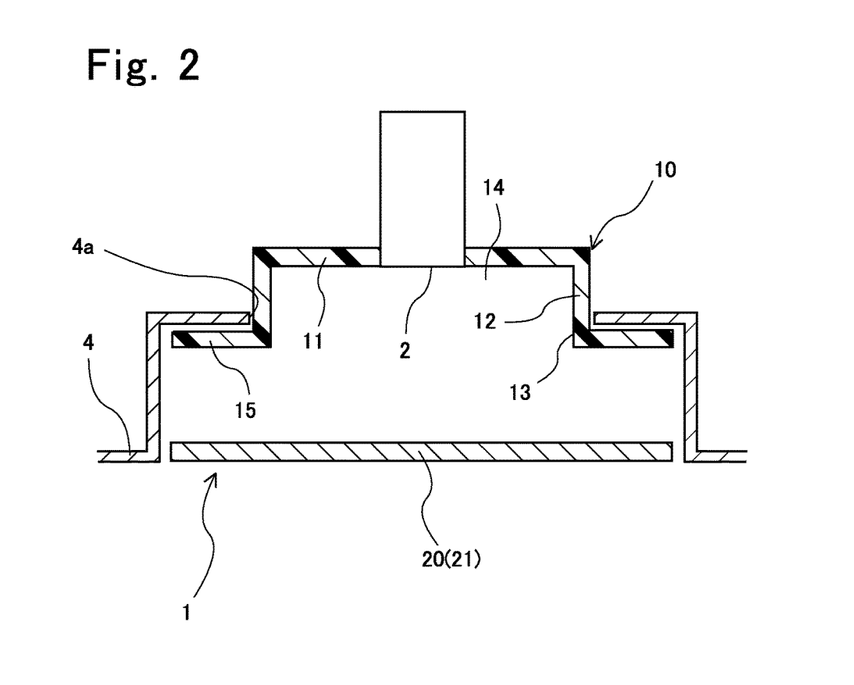
FIG. 2 is a sectional view of the driving device shown in FIG. 1, taken along line II-II.
Figure 3:
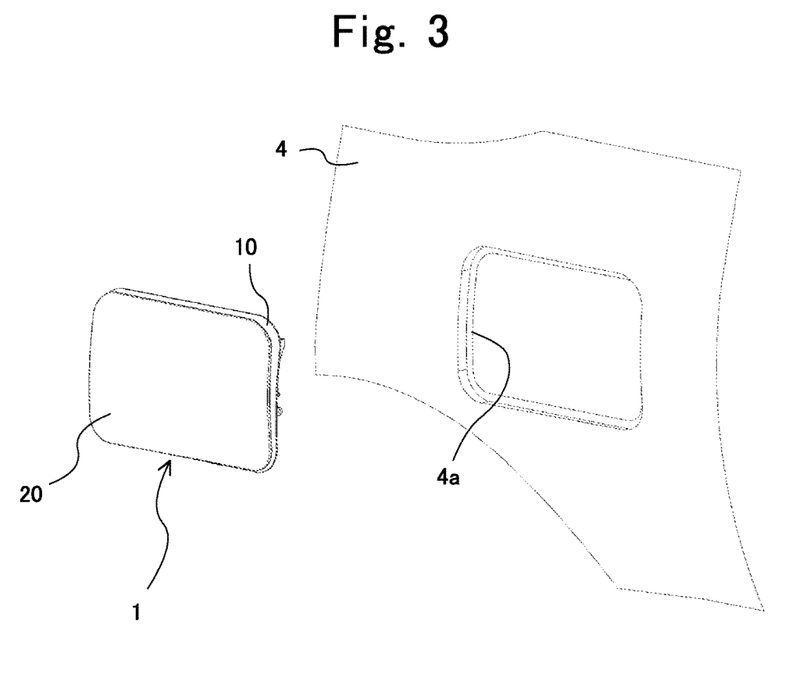
FIG. 3 shows a state before the driving device for energy replenishment port visor member of the embodiment is attached to the vehicle body, as seen from an obliquely upper side.
Figure 4:
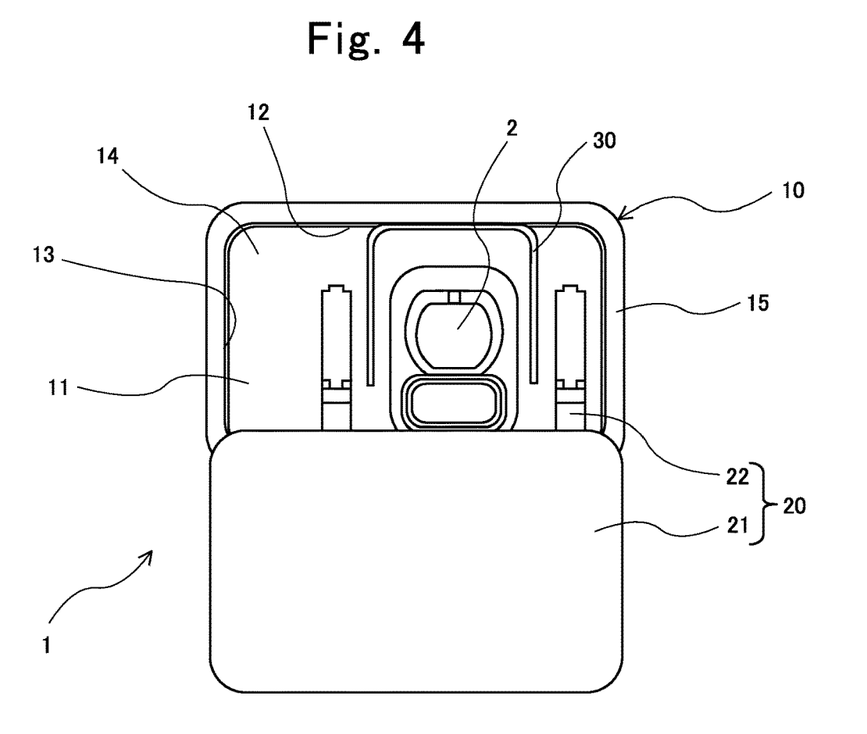
FIG. 4 shows a state in which the driving device for energy replenishment port visor member of the embodiment is at a lid opened position, as seen from the front side of the lid.

A driving device 1 for energy replenishment port visor member (hereinafter, simply referred to as driving device 1)

of the present embodiment is a device for controlling driving of members provided around a replenishment port 2 (see FIG. 2 and FIG. 4). The target members to be drive-controlled by the driving device 1 are an open/close lid for opening/closing a vehicle-body-side opening at which a replenishment port 2 is provided, and a visor member for preventing entry of rain/snow into the replenishment port 2 in a state in which the open/close lid is opened, as described later.

The driving device 1 is mounted to a vehicle such as a gasoline vehicle, a diesel vehicle, an electric vehicle, or a hybrid vehicle. The vehicle-body-side opening is an opening penetrating between inside and outside of a vehicle body 4 (see FIG. 1) and is provided at a side surface or a front surface of the vehicle body 4. The vehicle-body-side opening may be an opening 4a (see FIG. 3) provided to the vehicle body 4 itself, or may be an opening of a box body attached to the opening 4a provided to the vehicle body 4. In the present embodiment, the vehicle-body-side opening is a box opening 13 of an inlet box 10 described later.

Figure 7:
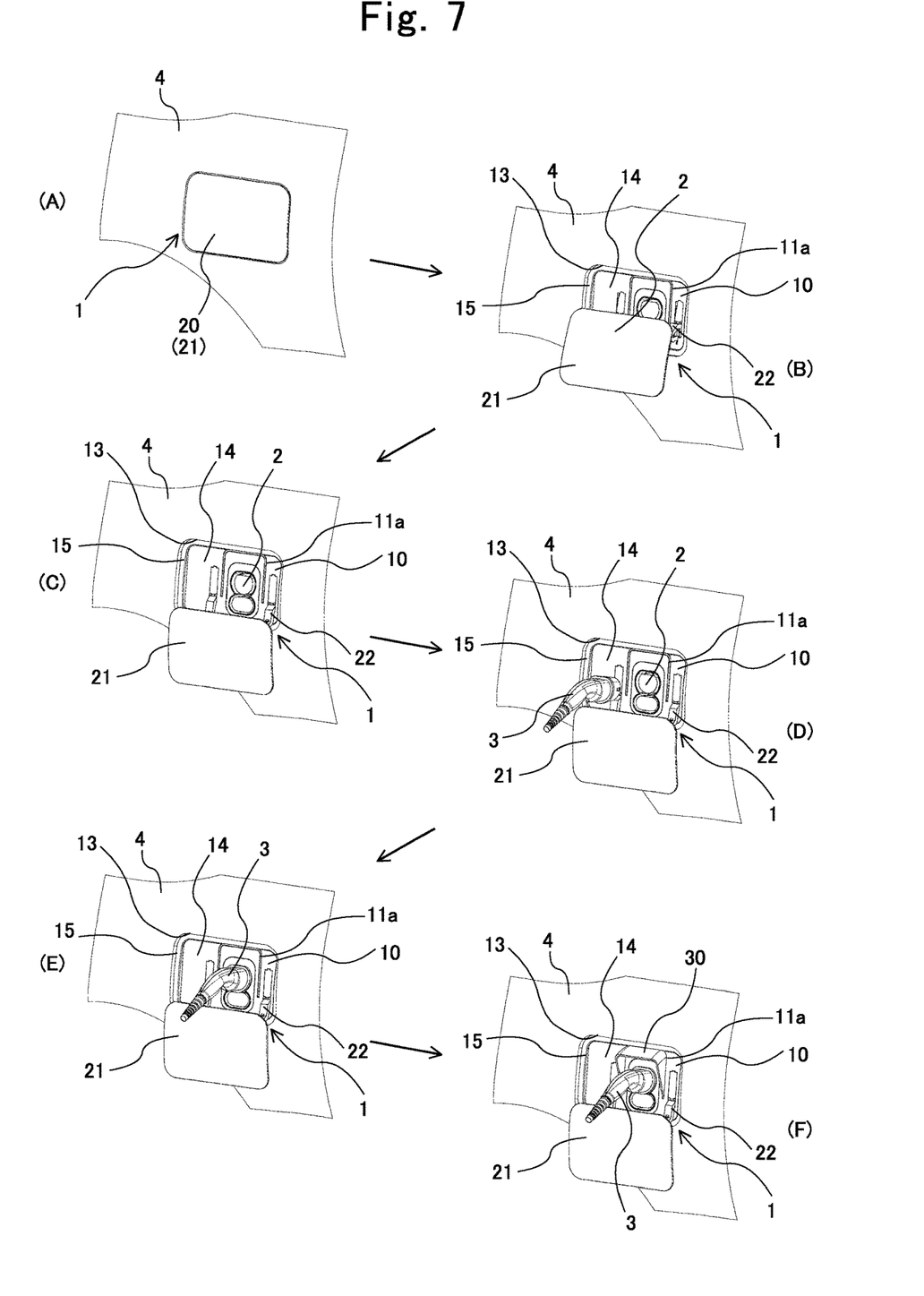
FIG. 7 is a perspective view showing state change during lid opening operation of the driving device for energy replenishment port visor member of the embodiment.

The replenishment port 2 is a fuel port or a charge port provided for energy replenishment such as refueling or battery charging to the vehicle. The replenishment port 2 is provided at one end of a tube or an electric wire. Another end of the tube or the electric wire is connected to a fuel tank or a battery provided on the vehicle body back side (i.e., vehicle-body inner side). The replenishment port 2 is provided at the vehicle-body-side opening so as to be exposed toward the vehicle-body outer side in a state in which the open/close lid is opened. The replenishment port 2 may be covered by a cap openable/closable by an operator. A gun 3 (see FIG. 7(D) to FIG. 7(F)) for energy supply is connectable to the replenishment port 2 in a cap opened state. The gun 3 is an energy replenishment gun such as a refueling gun provided at a gas station, etc., or a charging gun provided at a charging station, etc.

Figure 5:
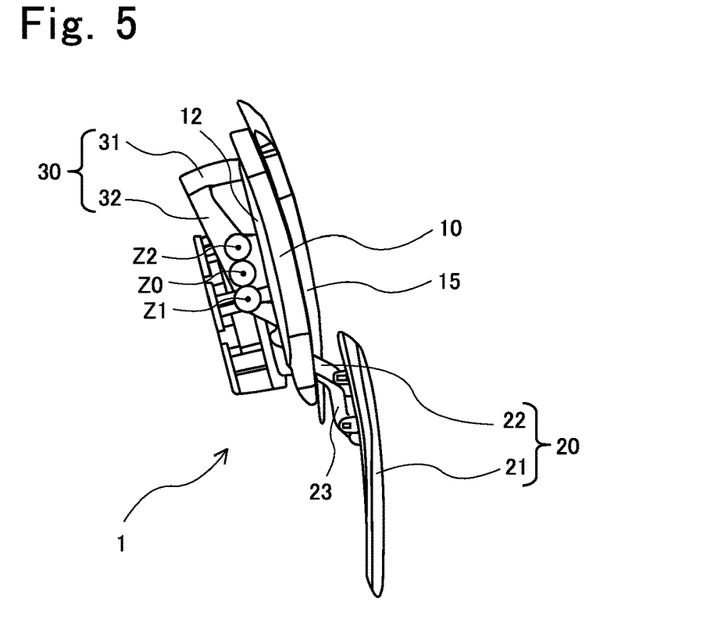
FIG. 5 is a side view of the driving device for energy replenishment port visor member of the embodiment, at the lid opened position, as seen from a lateral side of the lid.

As shown in FIG. 4 and FIG. 5, the driving device 1 includes the inlet box 10, an open/close lid 20, and a visor member 30.

The inlet box 10 is a vehicle-body-side member having a box shape and storing the replenishment port 2. The inlet box 10 is attached to the vehicle body 4 so as to be fitted into the opening 4a provided to the vehicle body 4. The inlet box 10 is located on the vehicle-body inner side correspondingly to the opening 4a of the vehicle body 4. The inlet box 10 has a bottom wall 11, a side wall 12, and the box opening 13. The bottom wall 11 and the side wall 12 form a storage space 14 for storing the replenishment port 2. The bottom wall 11 is a part having a quadrangular plate shape, for example. The side wall 12 is a wall part erected from an edge of the bottom wall 11 so as to surround the periphery of the bottom wall 11.

The box opening 13 is an opening provided to the inlet box 10, on the opposite side of the storage space 14 from the bottom wall 11. The box opening 13 is closed when the open/close lid 20 is at a closed position, and is opened when the open/close lid 20 is not at the closed position. When the box opening 13 is opened, the replenishment port 2 in the storage space 14 is exposed toward the vehicle outer side through the box opening 13. The inlet box 10 is attached to the vehicle body 4 such that the normal of the box opening 13 extends in a direction coinciding with the horizontal direction or extends in a direction inclined upward relative to the horizontal direction from the vehicle-body inner side to the vehicle-body outer side, for example.

The inlet box 10 has a frame 15. The frame 15 is formed in a loop shape along the periphery of the box opening 13. The frame 15 is formed in a flange shape extending from the periphery of the box opening 13 toward outside of the frame. The inlet box 10 is positioned with respect to the vehicle body 4 by the back surface of the frame 15 contacting with the front surface of the periphery of the opening 4a of the vehicle body 4, etc.

The open/close lid 20 is a lid member for opening/closing the box opening 13. The open/close lid 20 is movable between a closed position where the box opening 13 is closed and an opened position where the box opening 13 is opened (specifically, referred to as fully-opened position). The open/close lid 20 is pivotable about a first axis Z1 (see FIG. 5) relative to the inlet box 10. The open/close lid 20 is pivotable using a drive force from a lid driving unit 40 as described later, without being manually operated by an operator.

After the open/close lid 20 has reached the fully-opened position by receiving the drive force from the lid driving unit 40, the open/close lid 20 is retained at the fully-opened position without the drive force. The retention of the open/close lid 20 at the fully-opened position is achieved by a self-weight of the open/close lid 20 or a biasing force of a spring (not shown). The open/close lid 20 includes a lid body portion 21 and a lid arm portion 22.

The lid body portion 21 is a member formed in a plate shape for closing the box opening 13. The lid body portion 21 is formed in a shape (e.g., substantially rectangular shape) and a size corresponding to the box opening 13. When the open/close lid 20 is at the closed position, the lid body portion 21 is at such a position as to close the box opening 13 while being flush with the frame 15 at the periphery of the box opening 13 or the vehicle body surface. The surface of the 11d body portion 21 may be curved correspondingly to the vehicle body surface.

The lid arm portion 22 is a part extending in an arm shape and having one end connected to the lid body portion 21. The lid arm portion 22 extends between inside and outside of the vehicle body while penetrating the bottom wall 11 of the inlet box 10. The one end of the lid arm portion 22 is pivotably connected to the lid body portion 21, on the vehicle-body outer side relative to the bottom wall 11. Another end of the lid arm portion 22 is supported pivotably about the first axis Z1 relative to the inlet box 10, on the vehicle-body inner side relative to the bottom wall 11.

The other end of the lid arm portion 22 is attached and fixed in a non-pivotable state to a gear body of the lid driving unit as described later. The lid arm portion 22 pivots about the first axis Z1 integrally with the gear body at the other end thereof. The first axis Z1 is an axis extending horizontally. For example, in a case where the box opening 13 is provided on a vehicle body side surface, the first axis Z1 extends in the front-rear direction of the vehicle.

A pair of the lid arm portions 22 are provided. The pair of lid arm portions 22 are arranged so as to be separated from each other in the direction in which the first axis Z1 extends. The pair of lid arm portions 22 pivot synchronously with each other.

The open/close lid 20 further includes an auxiliary arm portion 23 other than the lid arm portions 22. The auxiliary arm portion 23 is a part extending in an arm shape and having one end pivotably connected to the lid body portion 21 and another end supported pivotably about an axis other than the first axis Z1 relative to the inlet box 10. A pair of the auxiliary arm portions 23 are provided. The pair of auxiliary arm portions 23 are arranged so as to be separated from each other in the direction in which the above axis extends. The pair of auxiliary arm portions 23 pivot synchronously with each other.

Pivoting of the auxiliary arm portions 23 about the above axis is performed in conjunction with pivoting of the lid arm portions 22 about the first axis Z1 such that the lid body portion 21 is kept parallel to the box opening 13. That is, the open/close lid 20 pivots about the first axis Z1 such that the lid body portion 21 is kept parallel to the box opening 13 through cooperation of the lid arm portions 22 and the auxiliary arm portions 23.

The visor member 30 is a member for preventing entry of rain/snow into the replenishment port 2 when the open/close lid 20 is at the fully-opened position. The visor member 30 advances/retracts between an advanced position where the visor member 30 covers the replenishment port 2 from above and a retracted position where the visor member 30 does not cover the replenishment port 2 from above. The visor member 30 is pivotable about a second axis Z2 relative to the inlet box 10. The visor member 30 is pivotable using a drive force from a visor driving unit 50 as described later, without being manually operated by an operator.

After the visor member 30 has reached the retracted position by receiving the drive force from the visor driving unit 50, the visor member 30 is retained at the retracted position without the drive force. The retention of the visor member 30 at the retracted position is achieved by a self-weight of the visor member 30 or a biasing force of a spring (not shown). The visor member 30 includes a visor plate portion 31 and a support portion 32.

The visor plate portion 31 is a part having a plate shape for covering the replenishment port 2 from above. The visor plate portion 31 is formed in a substantially horizontal shape or a shape curved correspondingly to the upper edge of the replenishment port 2. The visor plate portion 31 comes into a state of covering the replenishment port 2 from above, at the advanced position, and comes into a state of retracting from above the replenishment port 2, at the retracted position.

The support portion 32 is an arm-shaped part for supporting the visor plate portion 31 pivotably about the second axis Z2. The support portion 32 is pivotably supported at the second axis Z2. A pair of the support portions 32 are provided. The pair of support portions 32 are connected integrally to both axial-direction ends of the visor plate portion 31. Each support portion 32 may be formed to be a sector-shaped surface so as to expand in a planar shape around the second axis Z2. In this case, the support portions 32 cover the replenishment port 2 from the upper and lateral sides integrally with the visor plate portion 31, when the visor member 30 is at the advanced position.

The bottom wall 11 of the inlet box 10 has a through hole 11a that allows the visor member 30 to pass therethrough. The through hole 11a is formed in a reversed U shape or an upside-closed C shape. When the visor member 30 is at the retracted position, the visor plate portion 31 and the support portions 32 are stored on the vehicle-body inner side relative to the box opening 13 (more specifically, stored on the vehicle-body inner side relative to the bottom wall 11), and when the visor member 30 is at the advanced position, the visor plate portion 31 and the support portions 32 protrude relative to the bottom wall 11 through the through hole 11a (more specifically, protrude toward the vehicle-body outer side relative to the box opening 13).

Figure 6:
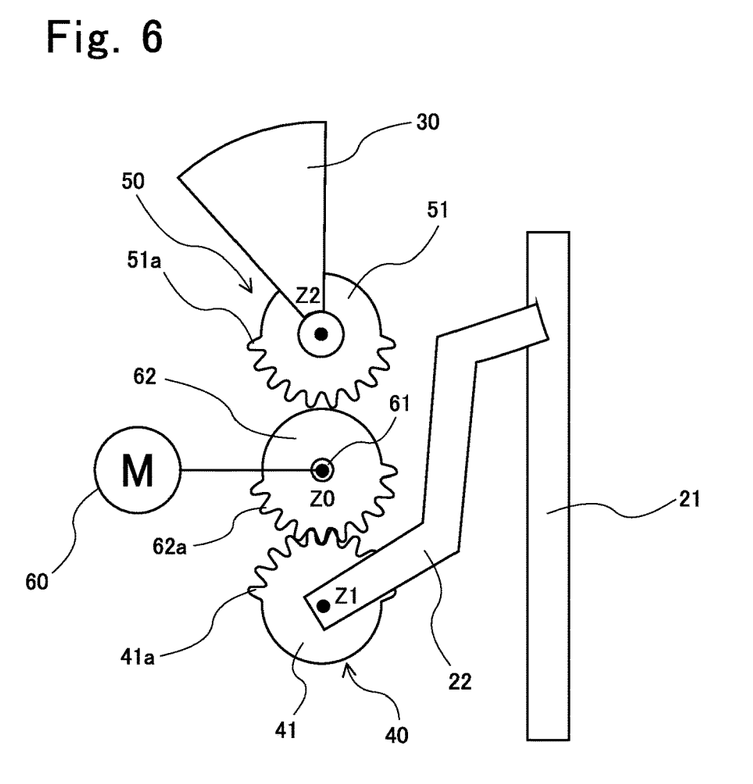
FIG. 6 is a side view showing states, at a lid closed position, of a lid driving unit and a visor driving unit included in the driving device for energy replenishment port visor member of the embodiment.

The driving device 1 includes the lid driving unit 40 and the visor driving unit 50, as shown in FIG. 6. The lid driving unit 40 is a part for pivoting and moving the open/close lid 20 between the closed position and the fully-opened position. The visor driving unit 50 is apart for advancing/retracting the visor member 30 between the advanced position and the retracted position. An actuator for providing the lid driving unit 40 with a force for moving the open/close lid 20 and an actuator for providing the visor driving unit 50 with a force for advancing/retracting the visor member 30, are an identical electric actuator 60.

That is, the lid driving unit 40 and the visor driving unit 50 are driven by one shared electric actuator 60. The electric actuator 60 is an electric motor for generating a drive force by supply of power. As drive forces, the electric actuator 60 generates an opening/closing-drive force for moving the open/close lid 20 between the closed position and the fully-opened position and provides the opening/closing-drive force to the lid driving unit 40, and also, generates an advancing/retracting-drive force for advancing/retracting the visor member 30 between the advanced position and the retracted position and provides the advancing/retracting-drive force to the visor driving unit 50.

The electric actuator 60 is connected, directly or via a speed reducer or the like, to an output shaft 61 which is rotatable about an output axis Z0. The output axis Z0 extends in parallel to the first axis Z1 and the second axis Z2. The output axis Z0, the first axis Z1, and the second axis Z2 are arranged in one line at intervals in the vertical direction.

A motor gear 62 is fixed to the output shaft 61. The motor gear 62 is formed in a substantially circular plate shape. The motor gear 62 rotates along with rotation of the output shaft 61 integrally therewith. The motor gear 62 has external teeth 62a. A plurality of the external teeth 62a are provided over a partial region of the entire outer circumferential region. The outer circumference of the motor gear 62 includes an external-tooth region where the external teeth 62a are provided, and a non-external-tooth region where the external teeth 62a are not provided. The external-tooth region of the motor gear 62 is provided in a range of 180° or less. The external-tooth region of the motor gear 62 may include a first region to mesh with a lid actuation gear 41 described below and a second region to mesh with a visor actuation gear 51 described below and may be set such that the first region and the second region do not overlap each other, for example.

The lid driving unit 40 includes the lid actuation gear 41. The lid actuation gear 41 is rotatably supported at the first axis Z1 relative to the inlet box 10. The lid actuation gear 41 is connected to the lid arm portions 22 of the open/close lid 20. The lid actuation gear 41 is formed in a substantially circular plate shape. The lid actuation gear 41 rotates integrally with the lid arm portions 22. The lid actuation gear 41 has external teeth 41a to mesh with the external teeth 62a of the motor gear 62. A plurality of the external teeth 41a are provided over at least a partial region of the entire outer circumferential region.

The visor driving unit 50 includes the visor actuation gear 51. The visor actuation gear 51 is rotatably supported at the second axis Z2 relative to the inlet box 10. The second axis Z2 extends in parallel to the output axis Z0 and the first axis Z1. The visor actuation gear 51 is connected to the visor member 30. The visor actuation gear 51 is formed in a substantially circular plate shape. The visor actuation gear 51 rotates integrally with the visor member 30. The visor actuation gear 51 has external teeth 51a to mesh with the external teeth 62a of the motor gear 62. A plurality of the external teeth 51a are provided over at least a partial region of the entire outer circumferential region.

The external teeth 62a of the motor gear 62 selectively mesh with either the external teeth 41a of the lid actuation gear 41 or the external teeth 51a of the visor actuation gear 51. That is, a timing when the external teeth 62a of the motor gear 62 mesh with the external teeth 41a of the lid actuation gear 41, and a timing when the external teeth 62a of the motor gear 62 mesh with the external teeth 51a of the visor actuation gear 51, are set so as not to overlap each other.

During rotation of the motor gear 62, there may be a timing when the external teeth 62a mesh with neither the external teeth 41a of the lid actuation gear 41 nor the external teeth 51a of the visor actuation gear 51. In particular, this non-mesh timing may be present during a period from when the external teeth 62a mesh with either the external teeth 41a of the lid actuation gear 41 or the external teeth 51a of the visor actuation gear 51 to when the external teeth 62a mesh with the other.

While the external teeth 62a of the motor gear 62 mesh with the external teeth 41a of the lid actuation gear 41, when the motor gear 62 rotates about the output axis Z0, the lid arm portions 22 rotate about the first axis Z1 along with the rotation of the motor gear 62. At this time, the external teeth 51a of the visor actuation gear 51 are opposed to the non-external-tooth region of the motor gear 62, and thus the external teeth 62a of the motor gear 62 and the external teeth 51a of the visor actuation gear 51 do not mesh with each other.

While the external teeth 62a of the motor gear 62 mesh with the external teeth 51a of the visor actuation gear 51, when the motor gear 62 rotates about the output axis Z0, the visor member 30 rotates about the second axis Z2 along with the rotation of the motor gear 62. At this time, the external teeth 41a of the lid actuation gear 41 are opposed to the non-external-tooth region of the motor gear 62, and thus the external teeth 62a of the motor gear 62 and the external teeth 41a of the lid actuation gear 41 do not mesh with each other.

Figure 9:
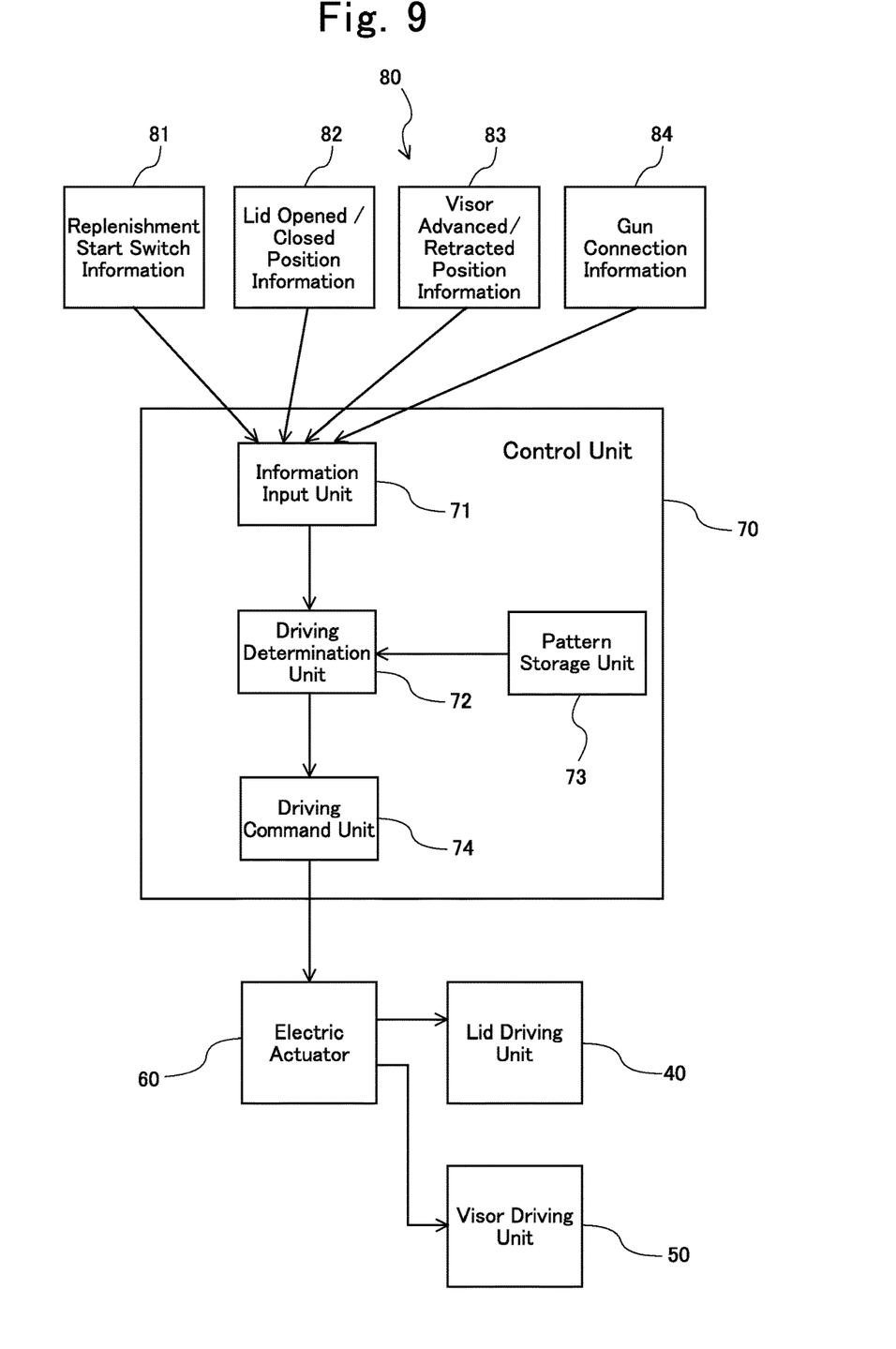
FIG. 9 is a configuration diagram of the driving device for energy replenishment port visor member of the embodiment.

As shown in FIG. 9, the driving device 1 includes a control unit 70 and a sensor switch unit 80. The control unit 70 is a part that executes lid control for, using the electric actuator 60, causing the lid driving unit 40 to execute opening/closing-driving so that the open/close lid 20 pivots between the closed position and the fully-opened position, and executes visor control for, using the electric actuator 60, causing the visor driving unit 50 to execute advancing/retracting-driving so that the visor member 30 advances/retracts between the advanced position and the retracted position. The sensor switch unit 80 is a part for outputting information needed for executing the above lid control and visor control.

The sensor switch unit 80 includes a replenishment start switch 81, a lid opened/closed position detection unit 82, a visor advanced/retracted position detection unit 83, and a gun connection detection unit 84.

The replenishment start switch 81 is an ON/OFF switch to be operated by an operator such as a vehicle driver or a vehicle owner for, when the open/close lid 20 is at the closed position, shifting the open/close lid 20 to the fully-opened position so as to allow connection of the gun 3 to the replenishment port 2. The replenishment start switch 81 is provided in a vehicle compartment or on a dedicated application of a smartphone. The replenishment start switch 81 outputs replenishment start switch information in accordance with operation by the operator.

The lid opened/closed position detection unit 82 is a sensor unit for detecting and outputting lid opened/closed position information in accordance with a position between the closed position and the fully-opened position of the open/close lid 20. The lid opened/closed position detection unit 82 is provided near the box opening 13 or the first axis Z1. The lid opened/closed position detection unit 82 may output information about whether or not the open/close lid 20 is at the closed position and whether or not the open/close lid 20 is at the fully-opened position.

The visor advanced/retracted position detection unit 83 is a sensor unit for detecting and outputting visor advanced/retracted position information in accordance with a position between the advanced position and the retracted position of the visor member 30. The visor advanced/retracted position detection unit 83 is provided near the through hole IIa of the bottom wall 11 or the second axis Z2. The visor advanced/retracted position detection unit 83 may output information about whether or not the visor member 30 is at the advanced position and whether or not the visor member 30 is at the retracted position.

The gun connection detection unit 84 is a sensor unit for detecting and outputting gun connection information in accordance with whether or not the gun 3 is connected to the replenishment port 2. The gun connection detection unit 84 is provided near the replenishment port 2. As the gun connection information, the gun connection detection unit 84 outputs ON information when the gun 3 is inserted and connected to the replenishment port 2, and outputs OFF information when connection of the gun 3 to the replenishment port 2 is released.

The gun connection detection unit 84 may detect connection of the gun 3 to the replenishment port 2, using change in light, pressure, or the like, or may detect connection of the gun 3 to the replenishment port 2 on the basis of detection of start of energy supply from the gun 3 connected to the replenishment port 2 (e.g., start of refueling or charging) or a notification from the external station side where such start of energy supply is detected.

The control unit 70 is composed of a microcomputer as a main component. The control unit 70 includes an information input unit 71, a driving determination unit 72, a pattern storage unit 73, and a driving command unit 74. The output information from each of the replenishment start switch 81, the lid opened/closed position detection unit 82, the visor advanced/retracted position detection unit 83, and the gun connection detection unit 84 is inputted to the information input unit 71. The information inputted to the information input unit 71 is provided to the driving determination unit 72.

The driving determination unit 72 is a part for determining which processing stage the present state is during the lid control and the visor control, by comparing the information provided from the information input unit 71 with a pattern stored in advance in the pattern storage unit 73. The pattern storage unit 73 stores a relational pattern between an input of the sensor switch unit 80 and a processing stage during the lid control and the visor control. The determination result of the driving determination unit 72 is inputted to the driving command unit 74. The driving command unit 74 is a part for commanding the electric actuator 60 in accordance with the determination result of the driving determination unit 72.

Figure 10:
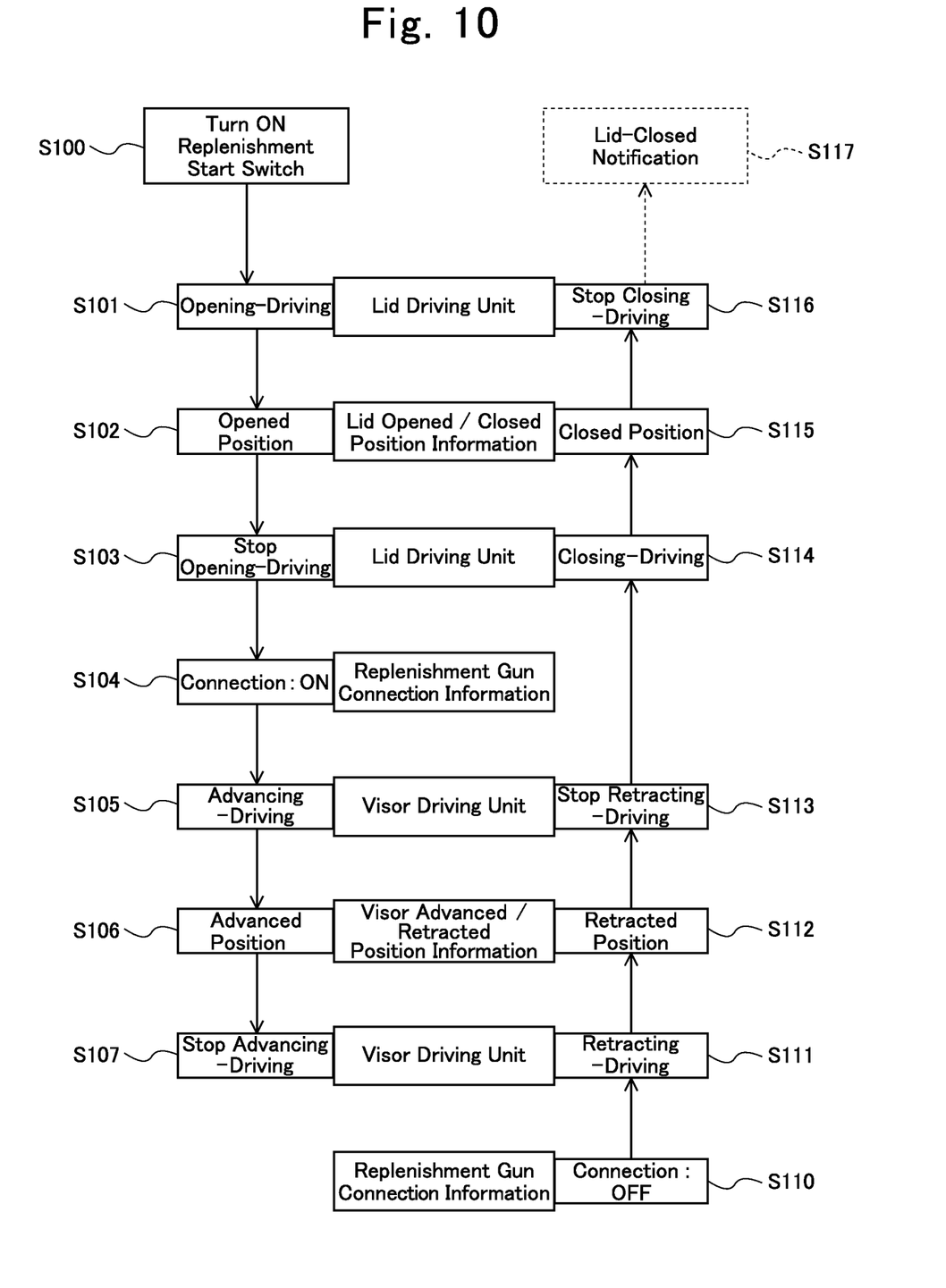
FIG. 10 is an example of an operation flowchart of the driving device for energy replenishment port visor member of the embodiment.

Hereinafter, with reference to FIG. 10, operation of the driving device 1 will be described.

Figure 8:
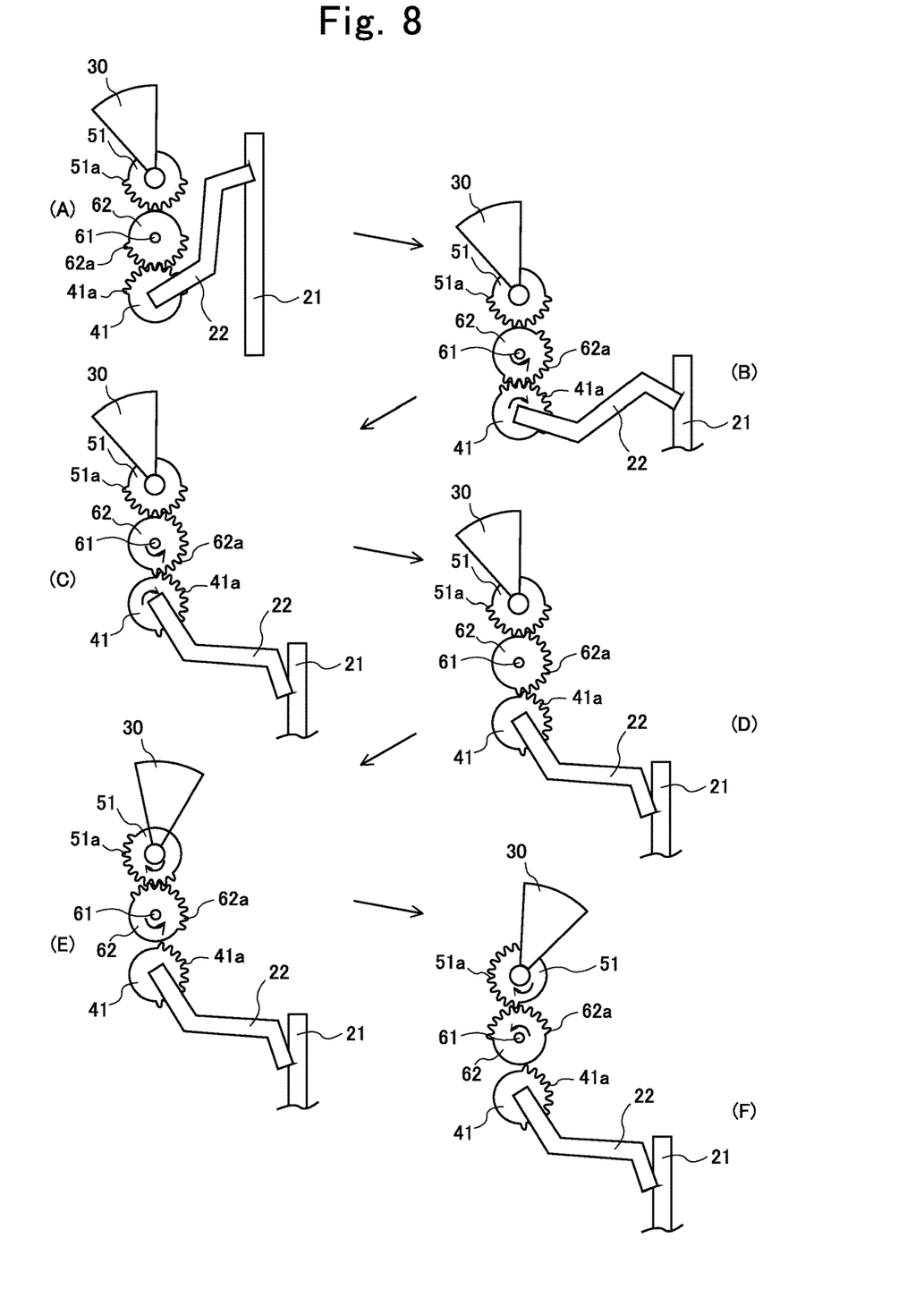
FIG. 8 is a side view showing state change during lid opening operation of the driving device for energy replenishment port visor member of the embodiment.

When the open/close lid 20 is at the closed position, connection of the gun 3 to the replenishment port 2 is impossible. In addition, when the open/close lid 20 is at the closed position, as shown in FIG. 8(A), the external teeth 62a of the motor gear 62 mesh with the external teeth 41a of the lid actuation gear 41, but do not mesh with the external teeth 51a of the visor actuation gear 51. Meshing between the motor gear 62 and the lid actuation gear 41 continues until the open/close lid 20 reaches the fully-opened position.

When an operator desires replenishment such as refueling or battery charging for the vehicle in a state in which the open/close lid 20 is at the closed position, first, the operator turns on the replenishment start switch 81. When the replenishment start switch 81 is turned on, replenishment start switch information indicating ON is inputted to the information input unit 71 (step S100 in FIG. 10). In response to this input, the driving determination unit 72 determines that, since the replenishment start switch information indicates ON, the present timing is a timing for causing the lid driving unit 40 to execute opening-driving for moving the open/close lid 20 from the closed position to the fully-opened position. Then, the driving command unit 74 causes the lid driving unit 40 to execute opening-driving, specifically, supplies power to the electric actuator 60 so as to generate an opening-drive force (step S101).

When the above power supply is performed, the electric actuator 60 generates the opening-drive force, so that, as shown in FIG. 8(B), the output shaft 61 rotates integrally with the motor gear 62 about the output axis Z0 in the first circumferential direction (counterclockwise direction in FIG. 6 and FIG. 8). In this case, since the motor gear 62 meshes with the lid actuation gear 41, the lid actuation gear 41 rotates integrally with the lid arm portions 22 about the first axis Z1 in the second circumferential direction (clockwise direction in FIG. 6 and FIG. 8). The above meshing between the motor gear 62 and the lid actuation gear 41 continues until the open/close lid 20 reaches the fully-opened position. Therefore, the above rotation of the output shaft 61, the motor gear 62, the lid actuation gear 41, and the lid arm portions 22 is continuously performed until the open/close lid 20 reaches the fully-opened position as shown in FIG. 8(C).

When the open/close lid 20 has reached the fully-opened position, lid opened/closed position information indicating that the open/close lid 20 has reached the fully-opened position is inputted from the lid opened/closed position detection unit 82 to the information input unit 71 (step S102). In response to this input, the driving determination unit 72 determines that, since the open/close lid 20 has reached the fully-opened position, the present timing is a timing for stopping opening-driving of the lid driving unit 40. Then, the driving command unit 74 stops opening-driving of the lid driving unit 40, specifically, stops power supply to the electric actuator 60 so as not to generate the opening-drive force (step S103).

When the above power supply is stopped, the electric actuator 60 no longer generates the opening-drive force, so that, as shown in FIG. 8(D), rotation of the output shaft 61, the motor gear 62, the lid actuation gear 41, and the lid arm portions 22 is stopped. At this time, the open/close lid 20 has reached the fully-opened position, and the replenishment port 2 is exposed toward the vehicle-body outer side through the box opening 13. In addition, at this time, the motor gear 62 and the lid actuation gear 41 do not mesh with each other.

When the replenishment port 2 is exposed toward the vehicle-body outer side through the box opening 13 as described above, connection of the gun 3 to the replenishment port 2 becomes possible. When the gun 3 is connected to the replenishment port 2 as shown in FIG. 7(D), gun connection information indicating that the gun 3 is connected to the replenishment port 2 is inputted from the gun connection detection unit 84 to the information input unit 71 (step S104). In response to this input, the driving determination unit 72 determines that, since the gun 3 is connected to the replenishment port 2, the present timing is a timing for causing the visor driving unit 50 to execute advancing-driving for advancing the visor member 30 from the retracted position to the advanced position. Then, the driving command unit 74 causes the visor driving unit 50 to execute advancing-driving, specifically, supplies power to the electric actuator 60 so as to generate an advancing-drive force (step S105).

When the above power supply is performed, the electric actuator 60 generates the advancing-drive force, so that, as shown in FIG. 8(E), the output shaft 61 rotates integrally with the motor gear 62 about the output axis Z0 in the first circumferential direction (counterclockwise direction in FIG. 6 and FIG. 8). When this rotation occurs, the motor gear 62 meshes with the visor actuation gear 51 and thus the visor actuation gear 51 rotates integrally with the visor member 30 about the second axis Z2 in the second circumferential direction (clockwise direction in FIG. 6 and FIG. 8). The above meshing between the motor gear 62 and the visor actuation gear 51 continues until the visor member 30 reaches the advanced position. Therefore, the above rotation of the output shaft 61, the motor gear 62, the visor actuation gear 5l, and the visor member 30 is continuously performed until the visor member 30 reaches the advanced position.

When the visor member 30 has reached the advanced position, visor advanced/retracted position information indicating that the visor member 30 has reached the advanced position is inputted from the visor advanced/retracted position detection unit 83 to the information input unit 71 (step S106). In response to this input, the driving determination unit 72 determines that, since the visor member 30 has reached the advanced position, the present timing is a timing for stopping advancing-driving of the visor driving unit 50. Then, the driving command unit 74 stops advancing-driving of the visor driving unit 50, specifically, stops power supply to the electric actuator 60 so as not to generate the advancing-drive force (step S107).

When the above power supply is stopped, the electric actuator 60 no longer generates the advancing-drive force, so that, as shown in FIG. 8(F), rotation of the output shaft 61, the motor gear 62, the visor actuation gear 51, and the visor member 30 is stopped. At this time, the visor member 30 has reached the advanced position, and the replenishment port 2 is covered by the visor member 30 from above. In addition, at this time, the motor gear 62 and the visor actuation gear 51 are kept meshing with each other.

As described above, in the driving device 1, when the replenishment start switch 81 is turned on in a state in which the open/close lid 20 is at the closed position, the open/close lid 20 moves from the closed position to the fully-opened position. Then, after the open/close lid 20 has reached the fully-opened position, the gun 3 is connected to the replenishment port 2 in the storage space 14 of the inlet box 10, whereby the visor member 30 advances from the retracted position to the advanced position.

In the above configuration, when the gun 3 is connected to the replenishment port 2 in a state in which the open/close lid 20 is at the fully-opened position, the visor member 30 advances from the retracted position to the advanced position, so that, above the replenishment port 2, the visor member 30 protrudes from the through hole 11a of the bottom wall 11 and further protrudes toward the vehicle-body outer side relative to the box opening 13. Thus, in a state in which the open/close lid 20 is at the fully-opened position, the replenishment port 2 is covered by the visor member 30 from above, whereby entry of rain/snow into the replenishment port 2 is prevented.

In the above configuration, unless the gun 3 is connected to the replenishment port 2, the visor member 30 does not advance from the retracted position to the advanced position. That is, before the visor member 30 advances from the retracted position to the advanced position, the gun 3 is allowed to be inserted and connected to the replenishment port 2 in a state in which the visor member 30 is not present above the replenishment port 2. At the time of connecting the gun 3 to the replenishment port 2, the visor member 30 has not been present at the advanced position yet and remains at the retracted position, that is, the replenishment port 2 is not covered by the visor member 30 from above. Thus, such a situation that connection operation for the gun 3 to the replenishment port 2 becomes difficult by being obstructed by the visor member 30, is avoided, and the connection operability is improved.

Accordingly, the driving device 1 prevents entry of rain/snow into the replenishment port 2 using the visor member 30 after connection of the gun 3 to the replenishment port 2, without deteriorating connection operability for the gun 3 to the replenishment port 2.

The visor member 30 is stored on the vehicle-body inner side relative to the box opening 13, at the retracted position, and protrudes toward the vehicle-body outer side relative to the box opening 13, at the advanced position. In the above configuration, unless the open/close lid 20 reaches the fully-opened position, the visor member 30 does not advance from the retracted position to the advanced position. That is, before the visor member 30 advances from the retracted position to the advanced position, movement of the open/close lid 20 from the closed position to the fully-opened position is started, and after the open/close lid 20 has reached the fully-opened position, the visor member 30 advances from the retracted position to the advanced position.

Therefore, since the visor member 30 does not advance to the advanced position in a state in which the open/close lid 20 has not reached the fully-opened position, occurrence of interference between the open/close lid 20 and the visor member 30 is avoided, whereby damage to the open/close lid 20 and the visor member 30 is prevented.

Next, in a state in which the open/close lid 20 is at the fully-opened position, the visor member 30 is at the advanced position, and the gun 3 is connected to the replenishment port 2, when the operator has completed replenishment for the vehicle and desires to return the open/close lid 20 to the closed position, the operator releases connection of the gun 3 to the replenishment port 2 by pulling out the gun 3 from the replenishment port 2. When connection of the gun 3 to the replenishment port 2 is released, gun connection information indicating that connection of the gun 3 to the replenishment port 2 is released is inputted from the gun connection detection unit 84 to the information input unit 71 (step S110). In response to this input, the driving determination unit 72 determines that, since connection of the gun 3 to the replenishment port 2 is released, the present timing is a timing for causing the visor driving unit 50 to execute retracting-driving for retracting the visor member 30 from the advanced position to the retracted position. Then, the driving command unit 74 causes the visor driving unit 50 to execute retracting-driving, specifically, supplies power to the electric actuator 60 so as to generate a retracting-drive force (step S111).

When the above power supply is performed, the electric actuator 60 generates the retracting-drive force, so that the output shaft 61 rotates integrally with the motor gear 62 about the output axis Z0 in the second circumferential direction (clockwise direction in FIG. 6 and FIG. 8). In this case, since the motor gear 62 meshes with the visor actuation gear 51, the visor actuation gear 51 rotates integrally with the visor member 30 about the second axis Z2 in the first circumferential direction (counterclockwise direction in FIG. 6 and FIG. 8). The above meshing between the motor gear 62 and the visor actuation gear 51 continues until the visor member 30 reaches the retracted position. Therefore, the above rotation of the output shaft 61, the motor gear 62, the visor actuation gear 51, and the visor member 30 is continuously performed until the visor member 30 reaches the retracted position.

When the visor member 30 has reached the retracted position, visor advanced/retracted position information indicating that the visor member 30 has reached the retracted position is inputted from the visor advanced/retracted position detection unit 83 to the information input unit 71 (step S112). In response to this input, the driving determination unit 72 determines that, since the visor member 30 has reached the retracted position, the present timing is a timing for stopping retracting-driving of the visor driving unit 50. Then, the driving command unit 74 stops retracting-driving of the visor driving unit 50, specifically, stops power supply to the electric actuator 60 so as not to generate the retracting-drive force (step S113).

When the above power supply is stopped, the electric actuator 60 no longer generates the retracting-drive force, so that rotation of the output shaft 61, the motor gear 62, the visor actuation gear 51, and the visor member 30 is stopped. At this time, the visor member 30 has reached the retracted position, and the replenishment port 2 is not covered by the visor member 30 from above. In addition, at this time, the motor gear 62 and the visor actuation gear 51 do not mesh with each other.

When the retracting-driving of the visor driving unit 50 is stopped as described above, next, the driving determination unit 72 determines that the present timing is a timing for causing the lid driving unit 40 to execute closing-driving for moving the open/close lid 20 from the fully-opened position to the closed position. Then, the driving command unit 74 causes the lid driving unit 40 to execute closing-driving, specifically, supplies power to the electric actuator 60 so as to generate a closing-drive force (step S114).

When the above power supply is performed, the electric actuator 60 generates the closing-drive force, so that the output shaft 61 rotates integrally with the motor gear 62 about the output axis Z0 in the second circumferential direction (clockwise direction in FIG. 6 and FIG. 8). When this rotation occurs, the motor gear 62 meshes with the lid actuation gear 41 and thus the lid actuation gear 41 rotates integrally with the lid arm portions 22 about the first axis Z1 in the first circumferential direction (counterclockwise direction in FIG. 6 and FIG. 8). The above meshing between the motor gear 62 and the lid actuation gear 41 continues until the open/close lid 20 reaches the closed position. Therefore, the above rotation of the output shaft 61, the motor gear 62, the lid actuation gear 41, and the lid arm portions 22 is performed until the open/close lid 20 reaches the closed position.

When the open/close lid 20 has reached the closed position, lid opened/closed position information indicating that the open/close lid 20 has reached the closed position is inputted from the lid opened/closed position detection unit 82 to the information input unit 71 (step S115). In response to this input, the driving determination unit 72 determines that, since the open/close lid 20 has reached the closed position, the present timing is a timing for stopping closing-driving of the lid driving unit 40. Then, the driving command unit 74 stops closing-driving of the lid driving unit 40, specifically, power supply to the electric actuator 60 so as not to generate the closing-drive force (step S116).

When the above power supply is stopped, the electric actuator 60 no longer generates the closing-drive force, so that rotation of the output shaft 61, the motor gear 62, the lid actuation gear 41, and the lid arm portions 22 is stopped. At this time, the open/close lid 20 has reached the closed position, and the replenishment port 2 is not exposed toward the vehicle-body outer side through the box opening 13. In addition, at this time, the motor gear 62 and the lid actuation gear 41 are kept meshing with each other.

After closing-driving of the lid driving unit 40 is stopped as described above, the operator may be notified that the open/close lid 20 has reached the closed position (step S117).

As described above, in the driving device 1, in a state in which the open/close lid 20 is at the fully-opened position, the visor member 30 is at the advanced position, and the gun 3 is connected to the replenishment port 2, when connection of the gun 3 to the replenishment port 2 is released, the visor member 30 retracts from the advanced position to the retracted position, and after the visor member 30 has reached the retracted position, the open/close lid 20 moves from the fully-opened position to the closed position.

In the above configuration, in a case where connection of the gun 3 to the replenishment port 2 is released in a state in which the open/close lid 20 is at the fully-opened position and the visor member 30 is at the advanced position, unless the visor member 30 retracts from the advanced position to the retracted position, the open/close lid 20 does not move from the fully-opened position to the closed position. That is, before the open/close lid 20 moves from the fully-opened position to the closed position, retraction of the visor member 30 is completed. Thus, since the open/close lid 20 does not move to the closed position in a state in which the visor member 30 is kept at the advanced position, occurrence of interference between the open/close lid 20 and the visor member 30 is avoided, whereby damage to the open/close lid 20 and the visor member 30 is prevented.

In the above configuration, for retracting the visor member 30 from the advanced position to the retracted position and moving the open/close lid 20 from the fully-opened position to the closed position, only operation of pulling out the gun 3 connected to the replenishment port 2 and releasing the connection is needed, and switch operation other than the operation of releasing the connection of the gun 3 to the replenishment port 2 need not be performed. Thus, the operation for retracting the visor member 30 from the advanced position to the retracted position and moving the open/close lid 20 from the fully-opened position to the closed position is simplified.

In the driving device 1, the actuator for providing the lid driving unit 40 with a force for moving the open/close lid 20 and the actuator for providing the visor driving unit 50 with a force for advancing/retracting the visor member 30, are the identical electric actuator 60. The electric actuator 60 transfers the generated drive force to the output shaft 61, thereby rotating the motor gear 62 fixed to the output shaft 61. The motor gear 62 has the plurality of external teeth 62a provided over a partial region of the entire outer circumferential region. The external teeth 62a of the motor gear 62 selectively mesh with either the external teeth 41a of the lid actuation gear 41 of the lid driving unit 40 connected to the open/close lid 20 or the external teeth 51a of the visor actuation gear 51 of the visor driving unit 50 connected to the visor member 30, in accordance with rotation of the motor gear 62.

While the motor gear 62 meshes with the lid actuation gear 41, the motor gear 62 does not mesh with the visor actuation gear 51, and only the open/close lid 20 pivots about the first axis Z1 along with rotation of the motor gear 62, thus performing opening/closing operation. On the other hand, while the motor gear 62 meshes with the visor actuation gear 51, the motor gear 62 does not mesh with the lid actuation gear 41, and only the visor member 30 pivots about the second axis Z2 along with rotation of the motor gear 62, thus advancing/retracting.

With this configuration, the lid actuation gear 41 of the lid driving unit 40 and the visor actuation gear 51 of the visor driving unit 50 are sequentially driven using one electric actuator 60. Specifically, at the time of starting replenishment, opening-driving of the lid actuation gear 41 is performed to move the open/close lid 20 from the closed position to the fully-opened position, and after the opening-driving is completed and then the gun 3 is connected to the replenishment port 2, advancing-driving of the visor actuation gear 51 is performed to advance the visor member 30 from the retracted position to the advanced position. In addition, after replenishment is completed, when the connection of the gun 3 to the replenishment port 2 is released, the retracting-driving of the visor actuation gear 51 is performed to retract the visor member 30 from the advanced position to the retracted position, and after the retracting-driving is completed, closing-driving of the lid actuation gear 41 is performed to move the open/close lid 20 from the fully-opened position to the closed position.

Thus, opening/closing-driving of the lid driving unit 40 and advancing/retracting-driving of the visor driving unit 50 are performed with one electric actuator 60 shared therebetween, whereby lid control and visor control are appropriately performed while the configuration is simplified.

At the time of starting replenishment, first, a drive force is provided from the electric actuator 60 to the lid actuation gear 41 via the output shaft 61 and the motor gear 62, thereby performing opening-driving of the lid driving unit 40. When the open/close lid 20 has reached the fully-opened position and the opening-driving is completed, operation of the electric actuator 60 is stopped once. Then, when the gun 3 is connected to the replenishment port 2, operation of the electric actuator 60 is restarted and a drive force is provided from the electric actuator 60 to the visor actuation gear 51 via the output shaft 61 and the motor gear 62, thereby performing advancing-driving of the visor driving unit 50. That is, at the time of starting replenishment, operation of the electric actuator 60 is stopped during a period from when opening-driving of the lid driving unit 40 is completed, i.e., the open/close lid 20 has reached the fully-opened position, to when advancing-driving of the visor driving unit 50 is started, i.e., the visor member 30 starts to advance from the retracted position.

Therefore, at the time of performing connection operation for the gun 3 to the replenishment port 2, a member present around the replenishment port 2 does not move. Thus, occurrence of interference between the member and the gun 3 is assuredly avoided, whereby damage to the member and the gun 3 is prevented.

In the above embodiment, the box opening 13 corresponds to a "vehicle-body-side opening" described in the claims, and the gun 3 corresponds to an "energy replenishment gun" described in the claims.

In the above embodiment, at the time of switching from retracting-driving of the visor driving unit 50 to closing-driving of the lid driving unit 40, power supply to the electric actuator 60 is stopped so that operation of the electric actuator 60 is stopped. However, the present invention is not limited thereto. At the time of switching from retracting-driving of the visor driving unit 50 to closing-driving of the lid driving unit 40, power supply to the electric actuator 60 may be continuously performed so that operation of the electric actuator 60 is continuously performed without interruption.

In the above embodiment, the actuator for providing the lid driving unit 40 with a force for moving the open/close lid 20 and the actuator for providing the visor driving unit 50 with a force for advancing/retracting the visor member 30, are the identical electric actuator 60. However, the present invention is not limited thereto. The actuator for providing the lid driving unit 40 with a force for moving the open/close lid 20 and the actuator for providing the visor driving unit 50 with a force for advancing/retracting the visor member 30, may be different from each other. In this modification, a force for rotating the lid actuation gear 41 of the lid driving unit 40 and a force for rotating the visor actuation gear 51 of the visor driving unit 50 are generated by separate actuators independent of each other, whereby opening/closing operation of the open/close lid 20 and advancing/retracting operation of the visor member 30 are finely controlled.

The present invention is not limited to the embodiment and the modifications described above, and various changes may be made without departing from the gist of the present invention.

This application claims priority on Japanese Patent Application No. 2021-153685 filed in Japan on Sep. 21, 2021, the entire contents of which are incorporated herein by reference.

The invention claimed is:

1. A driving device for energy replenishment port visor member, comprising:
    a visor member to be advanced/retracted between an advanced position where the visor member covers, from above, a replenishment port exposed at a vehicle-body-side opening and used for replenishing a vehicle with energy, and a retracted position where the visor member is retracted from above the replenishment port;
    a visor driving unit configured to advance/retract the visor member between the advanced position and the retracted position;
    a gun connection detection unit configured to detect whether or not an energy replenishment gun is connected to the replenishment port; and
    a control unit configured to cause the visor driving unit to execute advancing-driving for advancing the visor member from the retracted position to the advanced position, when the gun connection detection unit has detected that the energy replenishment gun is connected to the replenishment port in a state in which the visor member is at the retracted position.

2. The driving device for energy replenishment port visor member according to claim 1, wherein
    the control unit causes the visor driving unit to execute retracting-driving for retracting the visor member from the advanced position to the retracted position when the gun connection detection unit has detected that connection of the energy replenishment gun to the replenishment port is released in a state in which the visor member is at the advanced position.

3. The driving device for energy replenishment port visor member according to claim 2, further comprising:
    an open/close lid to be moved between a closed position where the vehicle-body-side opening is closed and an opened position where the vehicle-body-side opening is opened; and
    a lid driving unit configured to move the open/close lid between the closed position and the opened position, wherein
    the control unit causes the lid driving unit to execute closing-driving for moving the open/close lid from the opened position to the closed position, when the retracting-driving executed by the visor driving unit is completed in a state in which the open/close lid is at the opened position.

4. The driving device for energy replenishment port visor member according to claim 3, wherein
    an actuator for providing the visor driving unit with a force for advancing/retracting the visor member and an actuator for providing the lid driving unit with a force for moving the open/close lid, are an identical electric actuator.

5. The driving device for energy replenishment port visor member according to claim 1, further comprising:
    an open/close lid to be moved between a closed position where the vehicle-body-side opening is closed and an opened position where the vehicle-body-side opening is opened; and
    a lid driving unit configured to move the open/close lid between the closed position and the opened position, wherein
    the visor member is stored on a vehicle-body inner side relative to the vehicle-body-side opening, at the retracted position, and protrudes toward a vehicle-body outer side relative to the vehicle-body-side opening, at the advanced position, and
    the control unit causes the visor driving unit to execute the advancing-driving after opening-driving executed by the lid driving unit to move the open/close lid from the closed position to the opened position is completed.

6. The driving device for energy replenishment port visor member according to claim 5, wherein
    an actuator for providing the visor driving unit with a force for advancing/retracting the visor member and an actuator for providing the lid driving unit with a force for moving the open/close lid, are an identical electric actuator.

* * * * *